Jan. 5, 1954
F. J. SPANG
2,665,164
WELL FISHING SOCKET OR TOOL
Filed Jan. 27, 1949
4 Sheets-Sheet 1
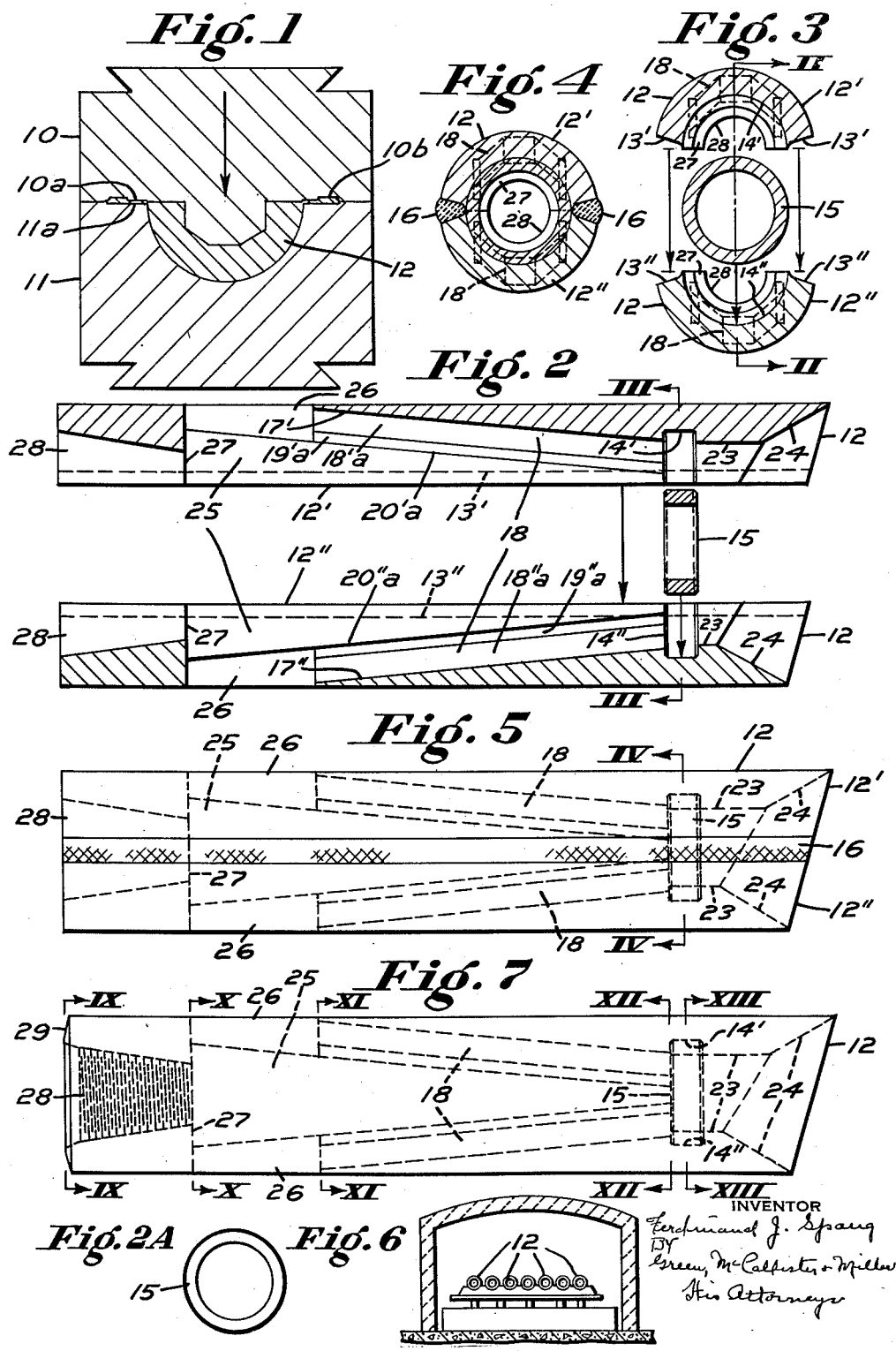

Jan. 5, 1954  F. J. SPANG  2,665,164
WELL FISHING SOCKET OR TOOL
Filed Jan. 27, 1949  4 Sheets-Sheet 2
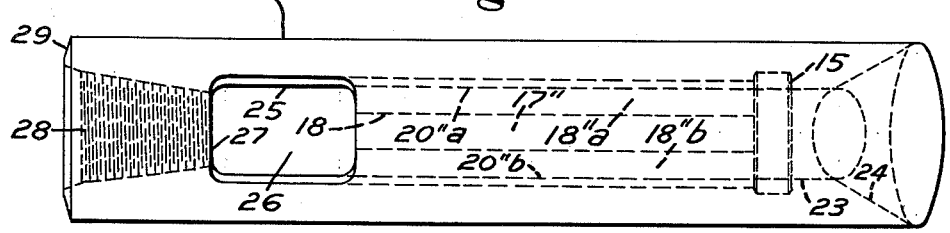
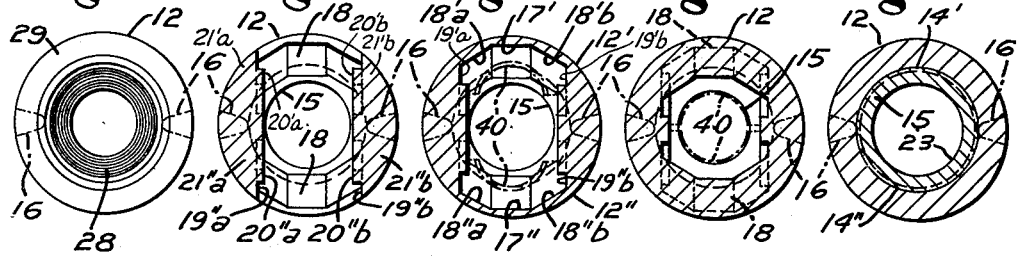
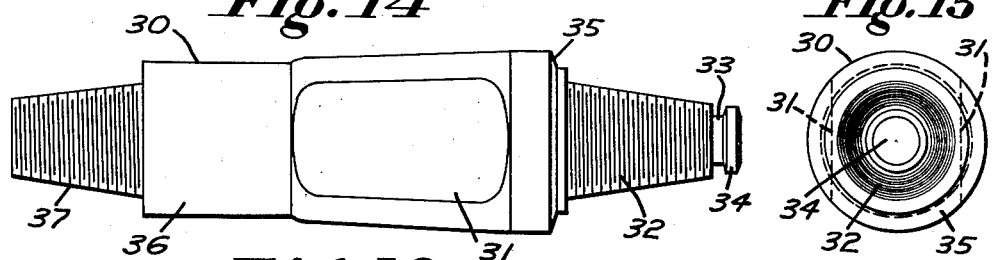
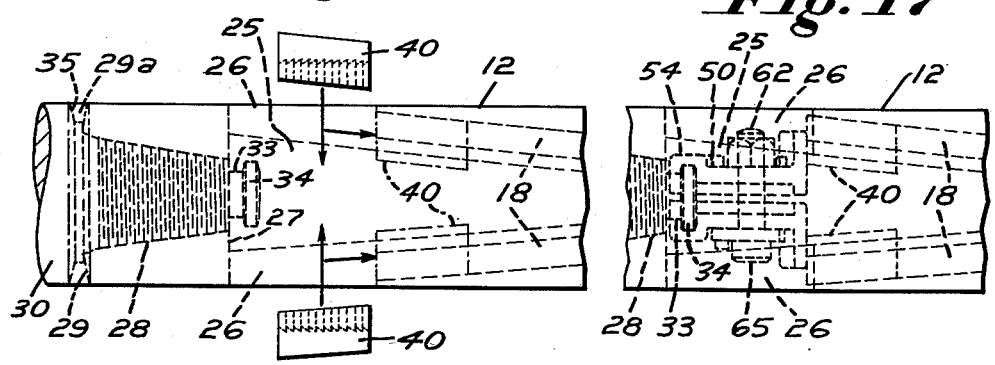
INVENTOR
Ferdinand J. Spang
BY
Green, McCallister & Miller
His Attorneys Jan. 5, 1954 F. J. SPANG 2,665,164
WELL FISHING SOCKET OR TOOL
Filed Jan. 27, 1949 4 Sheets-Sheet 3
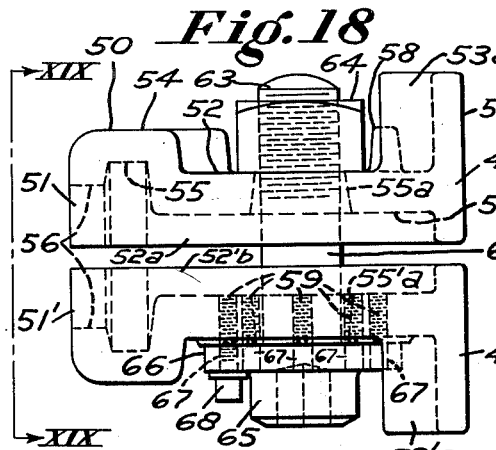
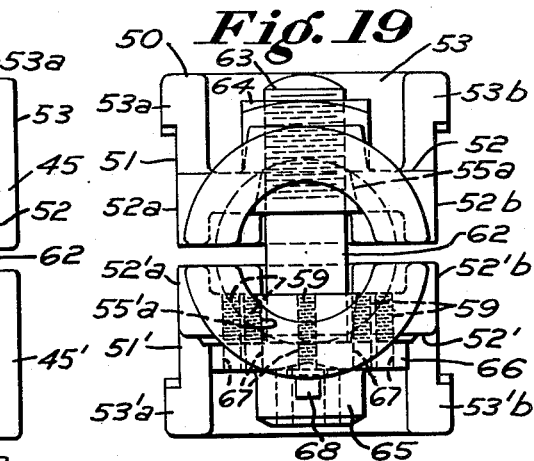
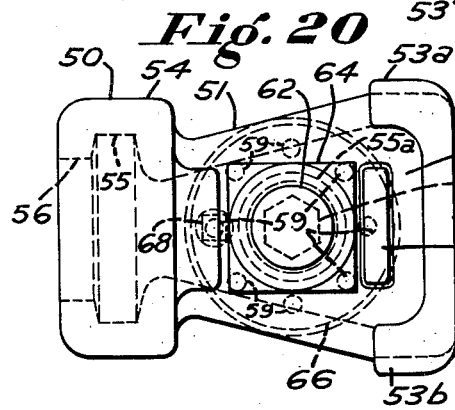
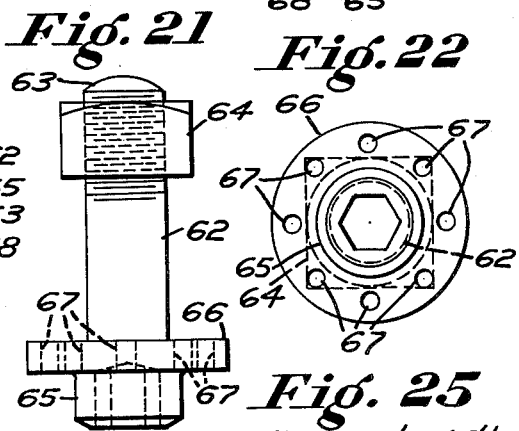
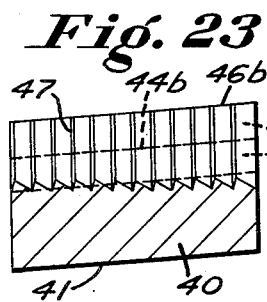
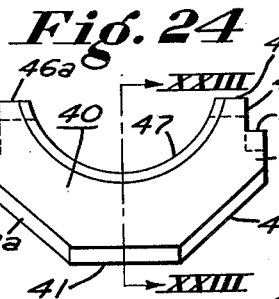
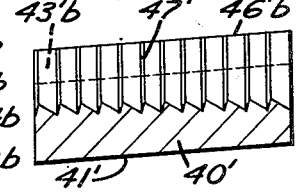
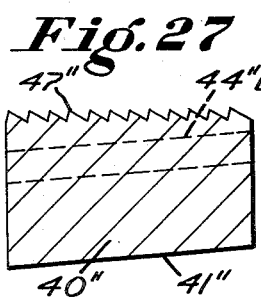
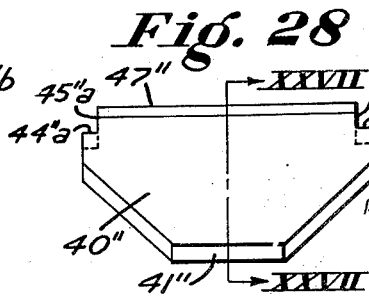

Jan. 5, 1954  F. J. SPANG  2,665,164
WELL FISHING SOCKET OR TOOL
Filed Jan. 27, 1949  4 Sheets-Sheet 4
*Fig.29*  *Fig.30*  *Fig.31*  *Fig.32*
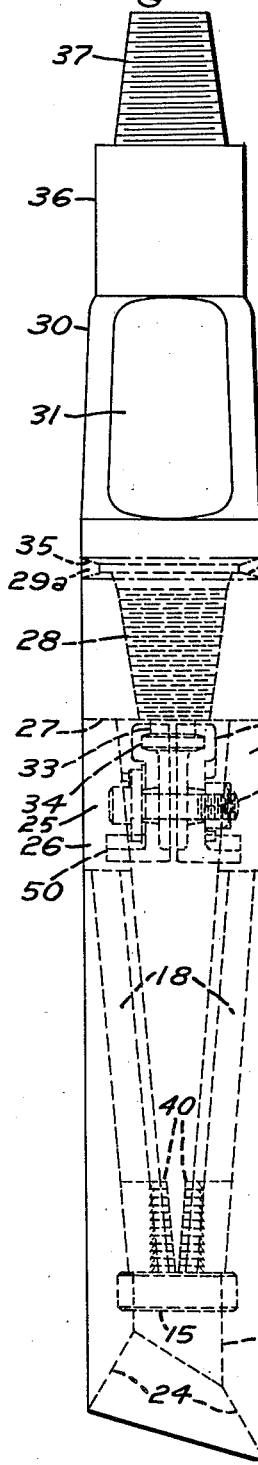
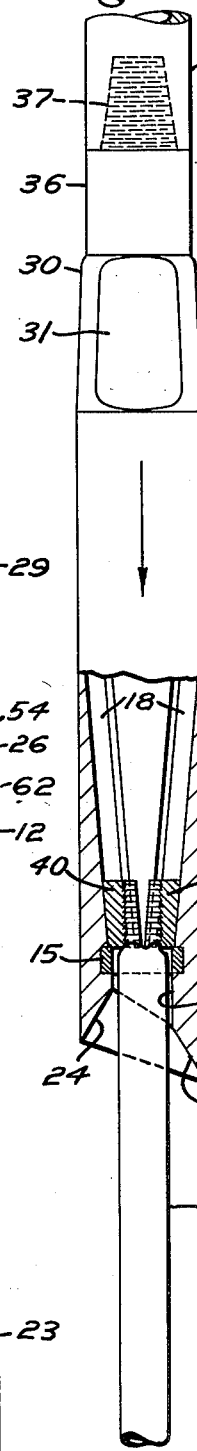
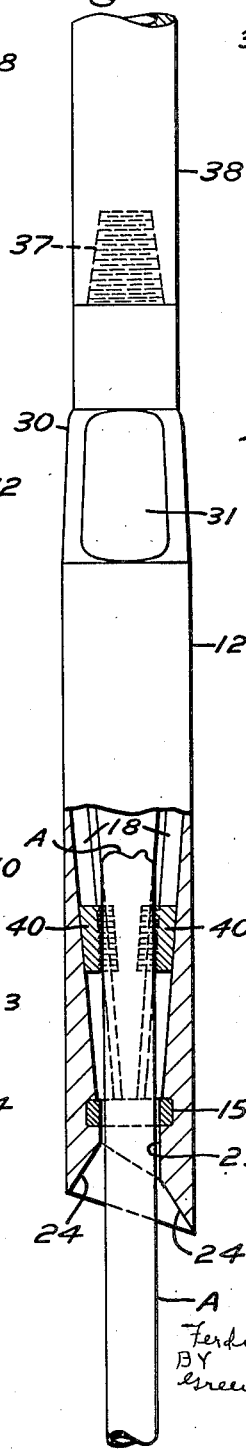
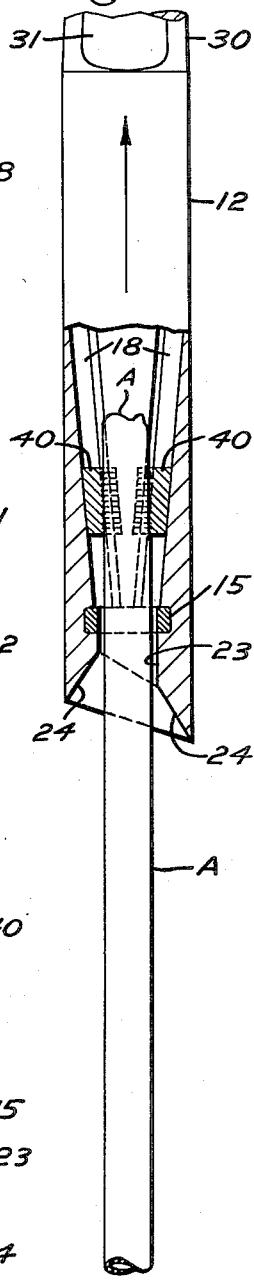
INVENTOR
Ferdinand J. Spang
BY
Green, McCallister & Miller
His Attorneys Patented Jan. 5, 1954

2,665,164

UNITED STATES PATENT OFFICE 2,665,164

WELL FISHING SOCKET OR TOOL

Ferdinand J. Spang, Butler, Pa., assignor to Spang & Company, Butler, Pa., a corporation of Pennsylvania Application January 27, 1949, Serial No. 73,137

16 Claims. (Cl. 294—102)

This invention pertains to well fishing equipment, and particularly, to a fishing tool or socket and procedure for making it.

Well fishing equipment, such as a fishing socket or tool, is used in cleaning out well bores. It is customary to employ tubing in such bores to convey fluid to the surface of the well and to employ reciprocating sucker or pump rods which operate inside of the tubes to raise liquids to the surface. Both the tubes and the rods are subjected to corrosion and wear and, as a result, one or both may part or separate within the well bore. Although the upper section of a well string (connected tubing or rods) can be removed, the lower parted section falls into the well bore and is known as the fish. The force of the fall may cause the parted section to buckle into an irregular mass. Due to the thinness of the tubes and their irregular shape, it is quite difficult to secure a proper hold on a tubing fish with the commonly employed grapples, fishing tools or sockets. If a rod is parted, difficulty is also encountered in obtaining and maintaining a proper hold on it. Conventional tools have little flexibility of utilization and a relatively short period of life.

It has been customary to provide a fishing socket with a gripper for holding the fish against a wall portion thereof. At the present time, it has been necessary to provide a large assortment of grippers to accommodate the various sizes and shapes of fish. Difficulty has been encountered in providing for the substitution of one type of gripper for another and to, at the same time, provide for the retention of the selected type within the socket. In this connection, there has been a tendency to loose the gripper through the lower (working) end of the socket. Since the lower or working end is subjected to a maximum amount of wear and tear, the provision of a suitable form of stop for the gripper constitutes an important problem. Such problem is further complicated where, as I have determined, it is desirable to heat condition the socket body after it has been formed. In such event, desired physical properties of the stop may be adversely affected.

Although I have determined that it is much easier to fabricate a socket body from a number of parts, questions of assembly, wear and impact resistance, operating characteristics, and designs are further complicated. On the other hand, I have determined if the socket body is fabricated from an integral piece that considerable difficulty is encountered in properly forming, shaping, and finishing the body, and that limitations are imposed as to its construction, etc.

It has thus been an object of my invention to provide a new and improved form of fishing tool or socket which will be inexpensive to fabricate and assemble;

Another object has been to provide a fishing tool or socket having improved operating characteristics and which will provide a solution to the problem presented.

Another object has been to provide a tool or socket whose construction is such that it has an increased period of active life and insures against the loss of grappling slips and components under rough usage;

A further object has been to devise a new and improved procedure for making such a tool;

And a still further object has been to devise a tool or socket having a flexibility of utilization and an improved taking-hold and retaining action upon the parted section or fish;

These and many other objects of my invention will be apparent to those skilled in the art in view of the hereinafter described illustrated embodiment thereof.

In the drawings,

Figure 1 is a somewhat diagrammatic vertical section through a pair of forging dies and illustrating a step in the manufacture of a tool in accordance with my procedure;

Figure 2 is an exploded side section taken along the line II—II of Figure 3 and illustrating a step in the manufacture or assembly of a tool in accordance with my procedure;

Figure 2A is an end view in elevation of a ring element of the assembly shown in Figures 3 and 4;

Figure 3 is an exploded end section taken along the line III—III of Figure 2;

Figure 4 is an assembled end section taken along the line IV—IV of Figure 5;

Figure 5 is a side view in elevation of the assembled main tool body of Figure 4;

Figure 6 is a somewhat diagrammatic end section illustrating a heat treating or conditioning step for an assembled main tool body of my invention;

Figure 7 is a side view in elevation, somewhat similar to Figure 5, but showing a completed unitary main body of a tool of my invention;

Figure 8 is a side view in elevation taken at right angles to Figure 7;

Figure 9 is an end view in elevation taken along the line IX—IX, and Figures 10, 11, 12 and 13 are sectional views taken along the lines X—X, XI—XI, XII—XII, XIII—XIII, respectively, of Figure 7;

Figure 14 is a side view in elevation of a stub which may be employed with the main body part of Figures 7 and 8; and, Figure 15 is an end view in elevation taken from the right end of Figure 14;

Figure 16 is a fragmental side view in elevation showing the stub of Figure 14 securely mounted in position on the main body part of Figures 7 and 8 to provide a complete socket or tool and illustrating by full and dotted lines how a pair of slip or grip elements, may be mounted in the main body;

Figure 17 is a fragmental side view taken from the same side as Figure 16 and showing a closure-retainer means locked or mounted on the stub and within the socket body for preventing the loss of slip elements from the upper end of or from slip entry openings (ports) of the body;

Figure 18 is an enlarged side detail in elevation of the closure means of Figure 17;

Figure 19 is an end view taken from the left of Figure 18; and Figure 20 is a side view taken at right angles to Figure 18;

Figure 21 is an enlarged detail in elevation of bolt means employed in connection with the closure of Figures 18 to 20;

Figure 22 is an enlarged plan view showing a head portion of the bolt of Figure 21 and taken upwardly from the bottom of Figure 21;

Figure 23 is an enlarged side section in elevation of a medium size slip or grip element and taken along the line XXIII—XXIII of Figure 24;

Figure 24 is an end view in elevation of the slip element of Figure 23;

Figure 25 is a section similar to Figure 23 but showing a larger form of slip element and is taken along the line XXV—XXV of Figure 26;

Figure 26 is an end view in elevation of the slip element of Figure 25;

Figure 27 is a section similar to Figures 23 and 25, but showing a smaller type of slip element and is taken along the line XXVII—XXVII of Figure 28;

Figure 28 is an end view in elevation of the slip element of Figure 27;

Figure 29 is a longitudinal side view of a completed tool or socket constructed in accordance with my invention with the slip elements and closure means in position therein; this figure shows the normal vertical position of the tool in a drill hole when it is lowered to pick up a fish or parted member or section;

Figure 30 is a reduced side view in longitudinal elevation and partial section showing how a tool such as shown in Figure 29 is initially introduced over a fish or parted section in a drill hole; this figure shows the position of the slip elements when they first contact an end of the fish;

Figure 31 is a view similar to Figure 30, but showing the relative position of the slip elements and the fish when the tool has continued to move downwardly over the fish and the slip elements are somewhat loosely positioned with reference to the fish;

Figure 32 is a view similar to Figure 31, but showing the tool being raised out of the drill hole and illustrating how the slip elements are moved downwardly within the body of the tool to grip and securely hold the fish as the latter is being raised out of the well or drill hole.

In accordance with my invention, two sub, complementary, or similar body segments or parts are substantially fully shaped, formed, or fabricated in an economical manner, as by a die forging operation (see Figure 1). Each of these parts are then machined out internally and assembled with a stop ring element, as shown in Figures 2 and 3. It will be apparent that the internal machining operation is facilitated and simplified by utilizing two body parts rather than a single integral body part. The machining of a unitary or one piece body through the openings therein is a very expensive and difficult operation. It will also be apparent that I am not limited as to the desired shape and construction of the socket body as is the case when a one piece body is fabricated and machined.

As shown in the exploded Figures 2 and 3, I employ a stop ring element which is inset or introduced into and between the two segments, parts or halves of the socket body. Semi-circular grooved portions within the two body segments form a supporting wall for the ring element. This ring element also serves to reinforce the body construction and to minimize wear and tear on its internal bore when the tool is being moved downwardly over a fish or parted section within a well hole.

Since the ring is separately formed, I can make it of a heat resistant special alloy steel or metal, such as chrome tungsten or high tensile steel, and suitably heat treat to provide it with requisite, physical and metallurgical properties. The ring or bushing should have a hardness such that it will resist damage from slip contacts. It is desirable to develop the welded body structure by heat treatment (see Figure 6) after the parts thereof have assembled and welded together as shown in Figures 2 to 5, inclusive. The two segmental parts of the body may be and preferably are fabricated from a lower grade metal than the closure ring, e. g. carbon steel. Thus, a subsequent heat treatment, as illustrated in Figure 6, can be effected at the lower heat treatment temperature of the segmental parts without, in any way, adversely affecting the ring part whose heat treatment temperature is relatively higher. As a result, temperature control is not critical from the standpoint of the ring and a full heat conditioning of the socket body can be effected to provide it with desired properties without any danger of adversely treating the ring part.

After longitudinally - extending chamfered edges of the body segments or parts are aligned and assembled in an abutting relationship, they are filled in with weld metal, as shown in Figures 4 and 5. After the heat conditioning operation of Figure 6, outer surface portions of the now-unitary body are machined, its upper connection bore is threaded, and the edges of its upper end are chamfered to provide a substantially finished socket body. Then, a die forged stud or stub is machined, threaded, and is chamfered at its one end (see Figure 14), is screwed into the connection portion of the socket body, weld metal is introduced between adjacent chamfered edges of the stud and body, and the weld is smoothed off, see Figure 16, to provide a complete, unitary socket body and stub construction.

The body, as a whole, is provided with inclined guides and slipways and slip-introducing entrance windows or ports, such that desired shapes and sizes of grapple slips may be inserted therethrough and can be most effectively employed in engaging and holding a fish or parted section.

The stub member or connector is secured to the upper end of the socket body for connecting the latter to a fishing line; and, a closure device or means is adapted to be removably and adjustably inserted within the windows of the body and locked on an extending stem of the stud to prevent the slip elements from being lost through the windows or entry ports of the socket body.

In Figure 1, I have shown a pair of male and female forging dies 10 and 11 provided with upper and lower flash grooves 10a and 11a and a backflash gutter 10b. The flash groove pairs 10a—11a and the gutter 10b are continuations of the die opening provided for a segmental part of a body 12 which is to be formed. The segmental body parts or halves 12' and 12", as shown in Figure 2, may be shaped from bar stock in accordance with a die forging procedure, such as set forth in my Patent No. 2,216,462 of October 1, 1940.

As previously intimated, after the forging operation, the two segmental parts 12' and 12" of the body 12 are internally machined, their longitudinal edges 13' and 13" are chamfered, and they are placed, as shown in Figures 2 and 3, in longitudinal or axial alignment, a stop ring or annulus element 15 is placed in alignment with their grooved portions 14' and 14", the body parts 12' and 12" are closed with respect to each other and over the ring 15, and the chamfered edges are filled with weld metal 16, see Figures 4 and 5. The ring 15 need not, itself, be welded in position as it is securely locked within the mounting grooved portions 14' and 14" of the segmental (semi-circular) body parts or halves 12' and 12". In Figure 7, the body 12 is a unitary cylinder provided with chamfered upper end edges 29 that are later joined by weld metal to the stub connector 30.

In Figures 9 to 13, inclusive, I have indicated by dot and dash lines the construction of the two segments 12' and 12" of the main body 12 of the tool. It will be apparent that the weld metal 16 forms with the segmental parts 12' and 12", a unitary, substantially finished body of the tool. As shown in Figures 7 and 8, the body 12 is provided with a grapple slipway or bore 18 which extends longitudinally-axially therealong. The grapple slipway 18 is defined by opposite inner wall portions of the body, as shown in Figures 11 and 12. One half of the slipway as provided by the body part 12' comprises, see Figures 2, 10 and 11, slideways 17', 18'a and 18'b, guideways 19'a and 19'b, and retainer ribs 20'a and 20'b, all of which slope longitudinally or axially inwardly toward the lower (right hand) end of the tool, and slope outwardly towards the opposite or connection end portion thereof. The above-mentioned slipway portions, see Figure 10, along with connecting wall portions 21'a and 21'b, complete the closure for one grapple slip element. The other or complementary body part 12" has, as shown, similar portions as indicated by double prime affixes.

The change in contour of the body 12 is illustrated in Figures 9 to 13 inclusive. It will be noted, by comparing Figure 7 with these figures, that the slideways extend between sections XI and XII and that the guideways, retainer ribs, and the connecting wall portions extend between the sections X and XII. It will also be noted that at one end of the body 12, the connecting portions terminate at the groove portions 14' and 14" which receive the retainer ring 15. As shown in Figure 13, the bore 23 of the body 12 is circular beyond the slipway bore 18 and the grooved portions 14' and 14" and terminates in an open conic bore 24 at the working end of the body 12, see Figures 2 and 8. The smooth bore 23 is provided to receive a fish of a parted section from the bell or cone-shaped bore 24 that is formed in an eccentric or fishtailed lower end of the tool body. The fish A, see Figures 30 and 31, is first entered in the latter bore as the tool is lowered by the well string, and then, passes upwardly through the smooth or circular bore 23, past the ring 15, into the slip-receiving or slipway bore 18.

Adjacent the other end of the body 12, the slipway 18 has an entry bore portion 25 which, as shown particularly in Figure 7, diverges upwardly and has a cone shape. The bore portion 25 is provided with opposite slip openings or ports 26. Ledge wall portions 27 are provided between the bore portion 25 and connect the latter to an open end, cone-shaped, connection bore portion 28 which is threaded or tapped, as shown in Figure 7, after the two segmental parts 12' and 12" are assembled, as shown in Figures 4 and 5.

As shown particularly in Figures 14 and 15, I have provided a stub connector 30 which, as illustrated in Figure 30, for example, is employed to removably suspend the unitary tool body 12 from a well string 38. The stub connector 30 has a wrench flat or shank portion 31 that at one end terminates in a male, outwardly converging, threaded portion 32 that is adapted to engage threads of the connection portion 28 of the tool body 12. The right hand or lower end portion 32 terminates in a stem 33 and an annular flange 34 which are adapted to extend within the entry bore portion 25 of the body 12, see Figure 16. As shown in Figure 17, the stem 33 and flange 34 are adapted to be engaged by the closure means which will be hereinafter described.

The other, left hand, or upper end of the stub connector 30 terminates in a spacer portion 36 and an upwardly-converging, cone-shaped, threaded male portion 37 which is adapted to be removably secured within a threaded female portion of the tubing or well string 38, see Figure 30.

After the two segments 12' and 12" of the tool body 12 are assembled by welding them in place along their opposed weld chamfers 13' and 13", the exterior of the body is finished machined and threads are cut in the connection bore 28. The connector stub 30 has a weld chamfer 35 that with the chamfer 29 of the body 12 receives weld metal 29a, see Figure 16.

In Figures 23 to 28, inclusive, I have shown several forms of slip or grapple elements which may be inserted through the opposite entry openings or ports 26, and then slid down along the slipway bore 18 into abutment with the retainer ring or element 15. I preferably insert one slip element or half through one entry port 26, and the other slip element of the pair through the other or opposite entry port 26.

In Figures 23 and 24, I have shown a medium size grapple slip half, in Figures 25 and 26 I have shown a larger size grapple slip half, and in Figures 27 and 28 I have shown a smaller type of grapple slip half.

Referring particularly to Figures 23 and 24, the slip 40 is provided with a bottom, horizontal or flat edge 41 which is adapted to slide along the guideways 17' or 17" of the main tool body 12, and opposite, upwardly, and outwardly inclined side edges 42a and 42b which are connected to the edge 41 and are adapted to slide along the guideways 18'a and 18'b, or 18"a and 18"b, respectively of the tool body 12. Vertical or flat side edges 43a and 43b are connected to the inclined edges 42a and 42b, respectively, and are adapted to slide along the guideways 19'a and 19'b, or 19"a and 19"b, respectively, of the body 12. The slip 40 also has retainer ledge portions 44a and 44b that are connected to the vertical side edge portions 43a and 43b, respectively, and terminate in inwardly offset side edges 45a and 45b. The edges 44a, 44b, 45a and 45b are adapted to slide along the portions 20'a, 20'b, 21a and 21b (or 20''a, 20''b, etc.), respectively, of the bore 18 of the main tool body 12. The offset, vertical side edges 45a and 45b are connected to horizontal or top edges 46a and 46b which are adapted to cooperate with similar edges of the other segmental half of the pair of slip elements 40. The top edges 46a and 46b terminate in a semi-circular portion 47 which is provided with wedge teeth to grip the fish A.

Referring particularly to Figures 25 and 26, I have shown an intermediate type of slip element 40' whose edges 41', 42'a, 42'b, 43'a and 43'b are of somewhat similar construction to the previously-described element 40. However, in this construction the side edges 43'a and 43'b are connected directly to the upper or horizontal edges 46'a and 46'b.

In the embodiment of Figures 27 and 28, the element 40'' is of somewhat similar construction to the element of Figure 24, except that its offset side edges 45''a and 45''b are connected directly to a substantial planar or horizontal top gripping edge 47''. This latter type of slip element 47'' is particularly suitable for a flattened fish, tube slivers or fragments, or a sucker rod, while the slip elements of Figures 24 and 26 can also be used for this purpose, they are particularly suitable for a hollow fish or a parted tubing section.

In Figures 18 to 23, inclusive, I have disclosed a closure means 50 which is adapted to be removably locked in position over the stem 33 and flange 34 of the connector stub 30, see particularly Figures 17 and 29. This means has a pair of clamping brackets 51 and 51' and a locking bolt 62 for holding them in an assembled relationship. The two bracket parts are of somewhat the same construction, and for this reason, similar parts of the two brackets are designated by the same numerals. That is, the parts of one bracket half 45 are designated by suitable numerals and similar parts of the other half 45' are designated by the same numerals with prime suffixes.

Referring particularly to Figures 18, 19 and 20, the upper bracket half 51 has a body portion 52 surmounted by an end flange portion 53 that extends upwardly therefrom to abut against and to serve as an upper limit stop for one of the slip elements. It will be noted that the flange portion 53 has a pair of curved, integral ear portions 53a and 53b which extend a short distance along the body portion 52 to materially strengthen the flange 53. Side edge walls 52a and 52b of the body portion 52 extend between the stop flange portion 53 and a mounting or connecting flange portion 54 which is of semi-circular, bulged-out shape. The connecting or mounting portion 54 is provided with a large semi-circular bore 55 which is adapted to receive the annular flange 34 of the connector stub 30, and also has a smaller bore 56 which is adapted to fit over the stem 33 of the connector stub 30.

The body portion 52 is provided with a rectangular space between the flange portions 53 and 54 which is connected to the small bore 56, see Figures 18 and 19. A hole 55a extends transversely through the body portion 52 and is of cone shape to somewhat loosely receive the clamping bolt 62. An abutment portion 58 projects outwardly from the outer surface of the body portion 52 to prevent a nut 64 from being loosened on the bolt 62 after the bracket parts 51 and 51' have been assembled.

The other bracket part 51' is provided with a circular hole 55'a extending transversely therethrough to receive the bolt 62, and is also provided with a series of spaced-apart setscrew-receiving threaded holes 59. As shown in Figures 21 and 22, the bolt or cap screw 62 has a threaded end 63 for receiving the nut 64, an integral Allen head (wrench-receiving socket head) 65, and an integral, circular securing flange 66. The flange 66 is provided with a series of spaced-apart holes 67 therethrough, corresponding in number and spacing to the threaded holes 59 of the bracket part 51'. As shown particularly in Figures 18, 19 and 20, one or more set screws 68 may be inserted through one or more of the holes 67 in the flange 66 of the bolt to engage within one or more of the threaded holes 59 of the securing bracket part 51'.

The bracket halves 51 and 51' of the closure device can be locked in a tight clamping relationship with respect to each other by the bolt 62 and will be held in such a relationship by the flange 66 and a set screw 68. That is, the bolt 62 is tightened to a desired extent by inserting a tool in its head portion 65 and is turned until one of the flange holes 67 aligns with a threaded hole 59 in the bracket 51', and a set screw 68 is then inserted to prevent any relative movement of the bolt. The set or cap screw 68 may also as shown have an Allen type of head (wrench-receiving socket head).

I will briefly summarize how a tool constructed in accordance with my invention may be assembled and used. As previously pointed out, the tool is made up of two main body parts or segments 12' and 12'' which are separately shaped and forged as by die-forging, see Figure 1. Then they are machined internally and are assembled, as shown in Figures 2 and 3, on a third part (stop ring or annulus) 15. After the two body parts 12' and 12'' are brought into position, they are welded lengthwise along their chamfer edges, as shown in Figures 4 and 5, to provide a unitary construction. Then the outer portions of the integral body 12 are machined and the bore 28 is provided with threads, see Figure 7. In the next step, as shown in Figure 6, a number of assembled body portions 12 may be placed in a heat treating furnace and properly conditioned. Next the stub connector 30 of Figure 14, is screwed into the upper end of the integral body 12 and their chamfer edges are welded, all as illustrated in Figure 16. This provides an integral tool body and connector construction. A pair of slips of a suitable type, such as 40 of Figure 24, are then inserted as shown in Figure 16 through the opposite entry windows of the body 12, and are slid along the ways provided by the bore of the body, see the dotted lines of Figure 16. Although the stop ring 15 prevents the slips from coming out the lower end of the body 12, it is necessary to provide some means, such as 50, to prevent them from being moved out through the entry ports. This means has been described in connection with Figures 18 to 20, inclusive, and is shown in a mounted relationship in Figure 17. The closure and upper stop means 50, as previously pointed out, consists of a pair of bracket portions 51 and 51' which are tightly clamped or mounted on the flange and stem portions 34 and 33 of the stub connector 30.

To assemble the device, I preferably introduce one bracket part 51 through one window or opening 26, and the other bracket part 51' through the other window or opening and then insert the bolt 62 through the bracket parts, tighten it up, and then positively lock the parts in an assembled relationship by the employment of one or more set screws 68. This provides a highly effective closure for the port entry openings and a positive stop support for limiting the upper movement of the slips along the slipway bore 18.

It will be apparent that my invention may be employed for picking up any shape or form of fish or parted section within a drill hole. As shown particularly in Figure 30, assuming that the fish is a separate pipe section or tubing, a complete socket and connector assembly (such as shown in Figure 29), is connected as shown in Figure 30, to a well string 38 and is lowered into the well and down upon the fish. As shown particularly in Figure 30, the fish A enters through the lower bore of the tool, passes the ring 15 and abuts against the grapple or slip elements 40, and as the downward movement continues, see Figure 31, the fish moves the slips 40 upwardly and outwardly along the slipway 18, or separates them, and permits the fish to slide upwardly therebetween. When a good grip has been obtained, then (as shown in Figure 32), the tool string is raised upwardly and the weight of the fish, plus the upward movement of the tool or socket causes the slip elements 40 to slide downwardly and inwardly along their ways until a very tight grip is obtained on the fish A, and the movement is continued until the fish is removed from the drill hole.

It will be apparent, if the fish A is of proper shape for entry into the bore of the tool, that the tool passes downwardly over it, its grapple slips are opened, and are then tightly closed about it. In the event that the fish is of such irregular shape as to resist entry, the fishing tool may be driven over it. If desired, the tool may also be turned about the fish by rotating the string 38. The wedging movement of the slips within the body of the tool not only provides a suitable size opening to receive the fish, but also closes such opening to tightly grip the fish and raise it out of the well hole.

The longitudinal, wedge-like extension of the slipway bore 18 provides for a considerable movement of the pair of slip elements from an open to a closed position, and thus, makes it unnecessary to provide a large number of sizes of grapple slips to accommodate different sizes and shapes of fish. That is, I have been able to utilize three different sizes for any type of operation desired. It will also appear that a fish made up of a relatively weak tube can be inserted within the socket body for a sufficient distance to strengthen the slip-holding action thereon. The fishing socket is so constructed that it is very rugged and can be readily driven over a difficult fish without danger of injury to it. It will also be apparent that it is practically impossible to accidentally loose the slips from the socket after the closure device has been mounted in its protected position therein. The low closure or ring 15 is preferably of a high temperature steel, such as chrome tungsten, which is resistant to the heat treatment shown in Figure 6 of the drawings. That is, it is of a type that will be unaffected as to its hardness by the equalizing treatment of the welded body 12 of the tool. The ring cannot thus be damaged by the fish or by continued jarring contacts with the grapple slips.

What I claim is:

1. A fishing tool which comprises, a substantially elongated integral body having side wall portions defining a bore therealong that is open through a lower end of said body and is open adjacent an upper end of said body through a transverse slip entry port in said side wall portions, at least one slipway on said side wall portions interiorly thereof and along the bore, said slipway converging toward the lower end of said body and diverging toward said slip entry port, at least one slip to be entered and removed through said port and slidably mounted on said slipway for movement therealong, a wear-resistant stop ring positioned at a lower end of said slipway and being securely mounted in a fixed inset position within said side wall portions to project inwardly therefrom and positively limit maximum downward movement of said slip along said slipway, a mounting portion on said body positioned within the bore adjacent said slip entry port, and clamping means accessible through said slip entry port and removably secured to said mounting portion to retain said slip on said slipway adjacent said slip entry port.

2. A fishing tool as defined in claim 1 wherein, said mounting portion is positioned within the bore in an opposed relationship with said slip entry port, and said clamping means is positioned to close said slip entry port and has a clamping portion removably accessible through said slip entry port.

3. A fishing tool which comprises, a substantially elongated integral body having side wall portions defining a bore therealong that is open through a lower end of said body and is transversely open through at least one slip entry port adjacent an upper end of said body, a pair of opposed slipways on the interior of said wall portions and along the bore, said slipways converging toward the lower end of said body and diverging toward said slip entry port, a pair of slips, one of said slips being slidably mounted on one of said slipways for movement therealong and the other of said slips being slidably mounted on the other of said slipways for movement therealong, a wear-resistant stop ring positioned at lower ends of said slipways and being securely mounted in a fixed inset position within said side wall portions to project inwardly therefrom and limit maximum downward movement of said slips along said slipways, a mounting portion on said body positioned within the bore adjacent said slip entry port, and clamping means accessible through said slip entry port and removably secured to said mounting portion to retain said slips on said slipways adjacent said slip entry port and retain said slips on said slipways adjacent said slip entry port.

4. A fishing tool which comprises, a substantially elongated body having side wall portions defining a bore therealong that is open to a lower end of said body, a connector stub on an upper end of said body and having a mounting portion projecting into the bore thereof, said wall portions having at least one slip entry port open transversely therethrough to the bore adjacent said mounting portion, at least one slipway on said side wall portions interiorly thereof and along the bore, said slipway converging toward the lower end of said body and diverging toward said slip entry port, at least one slip to be entered and removed through said port and slidably mounted on said slipway for movement therealong, a stop means positioned at the lower end of said slipway and secured to project inwardly from said side wall portions and limit maximum down movement of said slip along said slipway, and retainer means removably secured on said mounting portion to retain said slip on said slipway adjacent the upper end of said body.

5. A fishing tool as defined in claim 4 wherein, said retainer means has clamping parts that are removable through said slip entry port.

6. A fishing tool which comprises, a substantially elongated body, said body having side wall portions defining a bore therealong that is open to a lower end of said body, said wall portions having at least one slip entry port open transversely therethrough to the bore adjacent an upper end of said body, a slipway on said side wall portions and along the bore, said slipway converging toward a lower end of said body and diverging toward the slip entry port, at least one slip to be entered and removed through said port and being slidably mounted on said slipway, a wear-resistant ring positioned between the open end of said body and a lower end of said slipway and mounted between said side wall portions to limit maximum downward movement of said slip along said slipway, a connector stub secured within an upper end of said body, said stub having a flange portion projecting into the bore of said body adjacent the slip entry port, and a closure means mounted on said flange portion to retain said slip on said slipway adjacent an upper end of said body.

7. An improved fishing tool body construction which comprises, a pair of forged-out elongated and half-bore defining metal body segment halves, each of said body segment halves having a slipway machined-out along its half-bore, each of said slipways converging toward a lower end of its said body segment half and diverging toward its upper end, a grooved-out semi-circular portion in the interior of each of said body segments located at a lower end of said slipway, a wear and heat-resistant stop ring, said body segments being secured together by a weld metal in the form of an integral and longitudinal bore-defining integral body having an open lower end, said ring being secured in a fixed inset position within the grooved-out portions of said body segment halves to project inwardly from the bore of said integral body, the weld metal and the metal of said body segments being in an equalized heat-treated condition, at least one slip entry port open transversely through said cylinder into the bore thereof adjacent the upper end of said slipway, a stub connector having an intermediate portion threaded within the upper end of the bore of said integral body and secured thereto, said connector having a shank portion at its upper end and a stem portion at its lower end connected to said intermediate portion, said stem portion projecting into the upper end of the bore of said integral body and being in an opposed position with respect to said slip entry port, and an annular flange carried by said stem portion to receive a clamping closure for the slip entry port.

8. An improved fishing tool construction which comprises, a pair of forged-out elongated and semi-circular metal body segments, each of said body segments having a slipway machined out along its interior that converges toward its lower end and diverges toward its upper end, a grooved-out semi-circular portion in the interior of each of said body segments and located at a lower end of said slipway, a wear and heat-resistant stop ring, said body segments being secured together by weld metal in the form of an integral and longitudinal bore-defining cylinder having an open lower end, said ring being secured in a fixed inset position within the grooved portions of said body segments to project inwardly from the bore of said cylinder, the weld metal and the metal of said segments being in an equalized heat-treated position, a pair of slip entry ports, one of said ports being open transversely through one of said body segments into the bore of said cylinder, the other of said slip entry ports being open transversely through the other of said body segments into the bore of said cylinder and in an opposed relationship to said one port, a pair of slips to be entered and removed through said ports, one of said slips being slidably mounted on one of said slipways and the other of said slips being mounted on the other of said slipways, both of said slips being retained on said slipways at the lower end of said cylinder by said stop ring, a connector stub projecting from an upper end of said cylinder and having a mounting portion projecting into the bore thereof adjacent said slip entry port, and retainer means secured on said mounting portion to retain said slips on said slipways adjacent said slip entry port.

9. A fishing socket which comprises, an elongated body provided with a connector portion adjacent one end thereof for raising and lowering it into and out of a well hole, said body having a transverse slip entry port adjacent said first-mentioned end thereof and a bore extending longitudinally from the slip entry port through the other end of said body, an inclined slipway along said bore to slidably receive at least one slip element thereon through the slip entry port of said body, means positioned within said body to limit movement of said slip along said slipway to positions between the slip entry port and the open working end of said body, said means having a portion that is removable through said slip entry port to permit replacement of the slip, said connecting end portion being provided with a flanged stem extending into said bore adjacent said slip entry port; and said limiting means comprising, a clamping closure bracket secured on said flange stem to extend within said bore along said slip entry port, said clamping closure bracket constituting said removable portion of said limiting means, and stop means within said bore located within said bore located between said slipway and the open working end of said body.

10. A fishing socket which comprises, an elongated body provided with a connector portion adjacent one end thereof for raising and lowering it into and out of a well hole, said body having a transverse slip entry port adjacent said first-mentioned end thereof and a bore extending longitudinally from the slip entry port through the other end of said body, an inclined slipway along said bore to slidably receive at least one slip element thereon through the slip entry port of said body, means positioned within said body to limit movement of said slip along said slipway to positions between the slip entry port and the open working end of said body, said means having a portion that is removable through said slip entry port to permit replacement of the slip, said body having a second transverse slip entry port located opposite to said first-mentioned slip entry port, said slipway having a pair of longitudinally-upwardly and outwardly diverging slipway portions to slidably receive a pair of slip elements therein, said limiting means having a closure bracket removably secured within said body, and said closure bracket having the removable portion of said limiting means and closing off said slip entry port to limit upward movement of said pair of slip elements along the slipway portions adjacent the upper end of said body.

11. A fishing socket which comprises, an elongated body provided with a connector portion adjacent one end thereof for raising and lowering it into and out of a well hole, said body having a transverse slip entry port adjacent said first-mentioned end thereof and a bore extending longitudinally from the slip entry port through the other end of said body, an inclined slipway along said bore to slidably receive at least one slip element thereon through the slip entry port of said body, means positioned within said body to limit movement of said slip along said slipway to positions between the slip entry port and the open working end of said body, said means having a portion that is removable through said slip entry port to permit replacement of the slip, the bore of said body having a portion extending from said slip entry port through said connector end portion, a connector stub having an extending portion fitting within the bore of said body, said limiting means having a bracket mounted on the extending portion of said connector stub, said bracket having the removable portion of said limiting means, and means is provided to secure said connector stub to said body.

12. A fishing socket which comprises, an elongated body provided with a connector portion adjacent one end thereof for raising and lowering it into and out of a well hole, said body having a transverse slip entry port adjacent said first-mentioned end thereof and a bore extending longitudinally from the slip entry port through the other end of said body, an inclined slipway along said bore to slidably receive at least one slip element thereon through the slip entry port of said body, a slip element operatively mounted on said slipway, means positioned within said body to limit movement of said slip along said slipway to positions between the slip entry port and the open working end of said body, said means having a portion that is removable through said slip entry port to permit replacement of the slip, said body having a second transverse slip entry port located opposite to said first-mentioned slip entry port, said bore having a cone-shaped mouth bore portion at the working end of said body, said bore having a cone-shaped bore portion through the connection end portion of said body, said last-mentioned cone-shaped bore portion being threaded, a connector stub having a wrench flat portion and a cone-shaped threaded male portion at one end thereof, said threaded male portion being fitted within the cone-shaped threaded bore portion of said body, the cone-shaped threaded male portion of said stub having a flange that is positioned within the bore of said body adjacent said slip entry ports, said limited means having a separable closure bracket to be introduced and removed through said slip entry ports, said closure bracket being said removable portion of said limiting means and having a clamping bolt securely mounting it on an end portion of said cone-shaped threaded male portion, said closure bracket having means for additionally locking said clamping bolt in position, said connector stub having a cone-shaped threaded end portion adjacent its opposite end to secure it to a tool string for raising and lowering said body within a well hole, and said connector stub being welded to said body to form a unitary structure therewith.

13. A socket as defined in claim 12 wherein, said slipway inclines longitudinally-outwardly towards the upper end of said body, and said slip and said slipway are provided with interfitting splined portions for holding said slip in position within said slipway.

14. A method of making a fishing tool body construction of the character described which comprises, separately die-forging a pair of elongated and semi-circular body segments, each body segment having a slipway portion therealong and a semi-circular groove portion adjacent one end thereof, machining out each of said segments, forming a ring of heat-resistant metal, assembling the segments with the ring in position between the groove portions thereof, welding the segments longitudinally along their adjacent edges to form a unitary body construction, machining the exterior of the unitary construction, heat treating the unitary body construction to develop an equalization of the weld metal and the metal of the segments thereof at a temperature below the critical temperature of the heat-resistant ring, and threading the other end portion of the unitary body construction.

15. A method as defined in claim 14 which includes, separately die-forging a connector stub, threading opposite end portions of the connector stub, mounting one end portion of the connector stub within the threaded end portion of the unitary body construction, and welding adjacent edge portions of the stub to the body construction.

16. A method of making a fishing tool body construction which comprises, forming a pair of elongated and semi-circular body segments each with slipway portions therealong, machining out the inside of each of the body segments and forming a longitudinal slipway therealong, assembling the body segments into a circular body, welding the assembled segments together into a unitary body construction, heat treating the unitary body construction and developing an equalization of the weld metal and the metal of the body segments, and forming a connection on an end portion of the unitary body construction.

FERDINAND J. SPANG.

References Cited in the file of this patent

UNITED STATES PATENTS

| Number | Name | Date |
|---|---|---|
| 1,473,158 | Myracle | Nov. 6, 1923 |
| 1,587,022 | Montgomery | June 1, 1926 |
| 1,590,510 | Hinderliter | June 29, 1926 |
| 1,637,511 | Arbon | Aug. 2, 1927 |
| 1,660,850 | Spang | Feb. 28, 1928 |
| 1,700,991 | Wintercorn | Feb. 5, 1929 |
| 1,721,831 | Henderson | July 23, 1929 |
| 1,725,842 | Arbon | Aug. 27, 1929 |
| 1,732,962 | Brust | Oct. 22, 1929 |
| 1,813,015 | Bell | July 7, 1931 |
| 2,067,009 | Hinderliter | Jan. 5, 1937 |
| 2,289,329 | Dixon | July 14, 1942 |

FOREIGN PATENTS

| Number | Country | Date |
|---|---|---|
| 5,304 | Great Britain | of 1914 |